United States Patent
Mazzawi et al.

(10) Patent No.: US 10,502,779 B2
(45) Date of Patent: *Dec. 10, 2019

(54) DETERMINING TRANSIENT ERROR FUNCTIONAL MASKING AND PROPAGATION PROBABILITIES

(71) Applicant: OPTIMA DESIGN AUTOMATION LTD., Nazareth (IL)

(72) Inventors: Jamil Raja Mazzawi, Nazareth (IL); Ayman Kamil Mouallem, Mi'ilya (IL)

(73) Assignee: OPTIMA DESIGN AUTOMATION LTD., Nazareth (IL)

( * ) Notice: Subject to any disclaimer, the term of this patent is extended or adjusted under 35 U.S.C. 154(b) by 355 days.

This patent is subject to a terminal disclaimer.

(21) Appl. No.: 15/045,448

(22) Filed: Feb. 17, 2016

(65) Prior Publication Data

US 2016/0161557 A1  Jun. 9, 2016
US 2016/0370429 A9  Dec. 22, 2016

Related U.S. Application Data

(63) Continuation-in-part of application No. 14/624,603, filed on Feb. 18, 2015, now Pat. No. 10,025,895, and a continuation-in-part of application No. 14/601,312, filed on Jan. 21, 2015, now Pat. No. 9,430,599.

(60) Provisional application No. 62/106,305, filed on Jan. 22, 2015, provisional application No. 61/941,125, filed on Feb. 18, 2014.

(51) Int. Cl.
*G06F 17/50* (2006.01)
*G01R 31/317* (2006.01)
*G01R 31/3177* (2006.01)

(52) U.S. Cl.
CPC ... *G01R 31/31703* (2013.01); *G01R 31/3177* (2013.01); *G06F 17/5009* (2013.01); *G06F 17/5022* (2013.01)

(58) Field of Classification Search
None
See application file for complete search history.

(56) References Cited

U.S. PATENT DOCUMENTS

| | | | |
|---|---|---|---|
| 7,260,742 B2 * | 8/2007 | Czajkowski | G06F 11/1497 714/17 |
| 9,430,599 B2 * | 8/2016 | Mazzawi | G06F 17/5045 |
| 2007/0079223 A1 * | 4/2007 | Mondin | H03M 13/3746 714/780 |
| 2007/0162798 A1 * | 7/2007 | Das | G06F 11/0721 714/724 |

(Continued)

*Primary Examiner* — Kibrom K Gebresilassie (57) ABSTRACT

A method, system and product for determining transient error functional masking and propagation probabilities. An Error Infliction Probability of pair of nodes (source and destination) is representative of a Transient Error happening on a source node propagating to the destination node. The probability is computed by simulating a propagation of a transient error for plurality of cycles in a given trace. The simulation utilizes values from the trace for nodes that are not influenced by the error (but may influence its propagation). A plurality of cycle-simulations may be performed and a ratio of a number of times the transient error propagated to the destination node compared to a number of cycles examined may be used to compute the error infliction probability.

5 Claims, 6 Drawing Sheets

(56) References Cited

U.S. PATENT DOCUMENTS

| | | | |
|---|---|---|---|
| 2009/0067409 A1* | 3/2009 | Ku | H04L 12/66 370/352 |
| 2011/0145771 A1* | 6/2011 | Lamb | G06F 17/5009 716/108 |
| 2011/0202283 A1* | 8/2011 | Abdi | B82Y 10/00 702/19 |
| 2013/0096902 A1* | 4/2013 | Bose | G01R 31/31816 703/14 |
| 2015/0234967 A1* | 8/2015 | Mazzawi | G06F 17/5022 716/106 |
| 2017/0193183 A1* | 7/2017 | Abdi | G16H 50/30 |

* cited by examiner

DETERMINING TRANSIENT ERROR FUNCTIONAL MASKING AND PROPAGATION PROBABILITIES

CROSS-REFERENCE TO RELATED APPLICATION

The present application claims the benefit of Provisional Patent Application U.S. 62/106,305, filed 22 Jan. 2015, and is a continuation in part of patent application U.S. Ser. No. 14/601,312 filed Jan. 21, 2015 (Now U.S. Pat. No. 9,430,599) which is the non-provisional if Provisional Patent Application U.S. 61/941,125 filed on Feb. 18, 2014, and a continuation in part of U.S. patent application Ser. No. 14/624,603 filed on Feb. 18, 2015 (Now U.S. Pat. No. 10,025,895), 10 all of which are hereby incorporated in reference in their entirety for all purposes without giving rise to disavowment.

TECHNICAL FIELD

The present disclosure relates to microelectronic design in general, and to designing circuit that reduce a risk of soft error as a result of a Transient Error, in particular.

BACKGROUND

Transient Error (TE) is when a combinatorial-gate (combo-gate) inside an electronic chip has a glitch on its output, for any reason, one of them is radiation related to cosmic ray and nuclear particles coming from space, mostly from the Sun. The glitch may cause the value of the output of the combo-gate to be flipped. The TE itself may not permanently damage the device, but this glitch may propagate through the combinatorial logic and get sampled by a flop or a group of flops. From there it can propagate and cause a glitch that disturbs an expected functionality of the device. These radiation induced TEs cause memory glitches by bit flipping the output of a single memory element. It will be noted, however, that TE can spontaneously occur in any circuit due to other reasons as well.

Soft error due to TE occurs when a glitch affects an electronic device operation in a substantive manner. Soft errors pose a major challenge for the design of Very-Large-Scale Integration (VLSI) circuits, and more particularly so in technologies smaller than about 90 nm. In other words, smaller technology in a dense microelectronics Integrated Circuit (IC) are more sensitive to this radiation, and this may spell higher probability of TEs to occur. Another significant factor affecting this probability is, the distance of the electronic device from the face of our plant, such as, avionics devices installed in high altitude aircrafts and space gears. The deeper in space the device operates, the more exposed to radiation interactions it become.

Since most semiconductor components are susceptible to radiation damage, a need for radiation-hardened components evolved. These radiation-hardened initially targeted the military and space industries were based on their commercial equivalents, with some design variations that reduce the susceptibility to radiation damage. Memory IC hardening may comprise, error correcting memory using additional parity or Error Correction Code (ECC) bits and a "scrubber" circuit to continuously sweep the memory cells. Redundant processing and logic elements may be used to replace a single memory element with three memory elements and separate "voting logic" between them to continuously determine its result, this way, if one of the three elements got hit by SEU, the voting will clear the error immediately. For protection from TEs, special kind of combinatorial gates are used that are bigger in silicon area and power consumption but are more resilient to TEs. However, as technologies get smaller these hardening techniques are charging a high price of power consumption; performance (e.g., speed, heat); silicon real estate; extensive development and testing; or the like.

BRIEF SUMMARY

One exemplary embodiment of the disclosed subject matter is a computer-implemented method comprising: obtaining a representation of a circuit, wherein the circuit comprises nodes, wherein the nodes comprise at least one source-node and one destination-node; obtaining a trace, wherein the trace comprises recorded values of the nodes in a plurality of cycles; determining, by a processor, an Error Infliction Probability (EPP) of a pair of nodes, the pair comprising a source-node and a destination-node, wherein the EPP is a value representing a probability that a Transient Error (TE) happening on the source-node propagating to the destination-node in the same clock cycle it happened, wherein said determining comprises simulating a propagation of the TE from the source-node to the destination-node for plurality of cycles in the trace, wherein said simulating in each cycle utilizes values from the trace for nodes that are not influenced by the error but may influence its propagation, wherein the EPP is calculated as N/M, where N is the number of times the error propagated to destination-node, and M is the number of cycles examined; and outputting the EPP of the node.

Optionally, the method is performed by a processor of an apparatus.

Optionally, computer program product may retain program instructions directing a processor to perform the method.

Optionally, simulating the propagation of the TE for a given pair of destination-node and source-node and a given cycle is preformed by inverting the value of the source-node from the trace for the said cycle, calculating the new value of destination-node, using trace values of the same cycle for all other nodes not influenced by source-node, then comparing the calculated value of destination-node to its value in the trace at the same cycle to determine if the error has propagated.

Optionally, calculating the new value of destination-node is performed by applying a formula-method or a calc-forward-method.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

In the present disclosure the term "Transient Error" refers to a logical glitch on the output of a single combo-gate, (e.g., AND-gate, OR-Gate, XOR-Gate, MUX-Gate, or the like) or other kinds of gates. This glitch is temporary value change from 0 to 1 or 1 to 0 for a short period of time (sub-cycle). This glitch may be caused by electromagnetic radiation striking the combo-gate in the digital circuit, such as, a microprocessor, or the like. The bit flip may be a result of the free charge created by ionization in or close to a gate. The TE may occur spontaneously and unexpectedly due to an environment in which the circuit is operated.

TE may propagate through the combo-logic influenced by the said gate and get sampled (or latched) at one or more memory elements (flip-flop, latch, register or the like). Error Propagated (EP) is when a TE is inflicted at certain gate and the wrong value has propagated to the input of memory elements, and the memory element may sample the wrong value.

TE may not propagate through the combo-logic because it may be logically-masked by a combo-gate. For example, if the error goes into an AND gate where the other side of the AND had a value of 0, then it will be masked by this AND-gate.

The TE may also be masked by other reasons like electrical or timing and the like.

A Soft Error (SE) may be a disruption of the circuit's operation caused as a result of a TE inflected on a gate, the TE propagating to cause EP (was not logically masked), the EP is latched by a memory element. Then this erroneous latched value propagates sequentially and disrupt the operation of the chip. The disruption of the circuit's operation may be: outputting a wrong result, a malfunction, producing wrong calculation, bringing the circuit to a halt, enter a deadlock or a live-lock state, a combination thereof, or the like.

One technical problem dealt with by the disclosed subject matter is to identify combo-gates to be protected (or hardened) from TEs in order to reduce the probability of EP and hence the reduce the probability of SE. Traditionally, a utilization of blanket hardening solution may be used, (e.g., hardening all combo-gates of the circuit). However, the tradeoff between protecting all combo-gates on one hand and increasing the circuit's real-estate, power consumption and cost on the other may be counterproductive. In addition, increasing the real-estate and the power consumption of circuits may introduce a new set of problems that may be even more problematic than the soft error problem. In some exemplary embodiments, not all of the combo-gates are protected from TEs. By selectively protecting a sub-portion of the combo-gates of the circuit design, power consumption of the circuit is reduced. Real-estate inflation is reduced and associated costs thereof are also reduced.

One technical solution is to provide a user (e.g., chip-designer) with recommendations regarding selective hardening of combo-logic of the circuit. It should be noted that not all TEs striking the circuit may inflict an EP due to logical masking. In some exemplary embodiments, a probability that a TE striking a specific combo-gate will inflict an EP may be computed or estimated. Such probability may be referred to as Error Propagation Probability (EPP). It should be noted that Error Logical Masking Probability (ELMP) may be defined as the inverse of EPP; ELMP=1-EPP. Based on computed probabilities, recommendations may be provided as to which combo-gates should be protected against TEs. In some exemplary embodiments, a TE may be simulated in a combo-logic on a given cycle and the simulation may be used to determine whether the TE propagated and inflicted an EP or not in that cycle. Using the outcomes of several such simulations of different cycles, the probability may be computed for the said combo-gate. In some exemplary embodiments, the user may be provided with selective hardening recommendations based on the probability of each combo-gate in the circuit.

The EPP can be calculated between any pair of nodes that are connected together by combo-gates only without any memory elements between them. We call these nodes source-node and destination-node. For example, in FIG. 3, EPP can be calculated from Node A 310 to Node J 320, from Node A 310 to Node L, from Node A 310 to Node O and the like.

Figure 3:
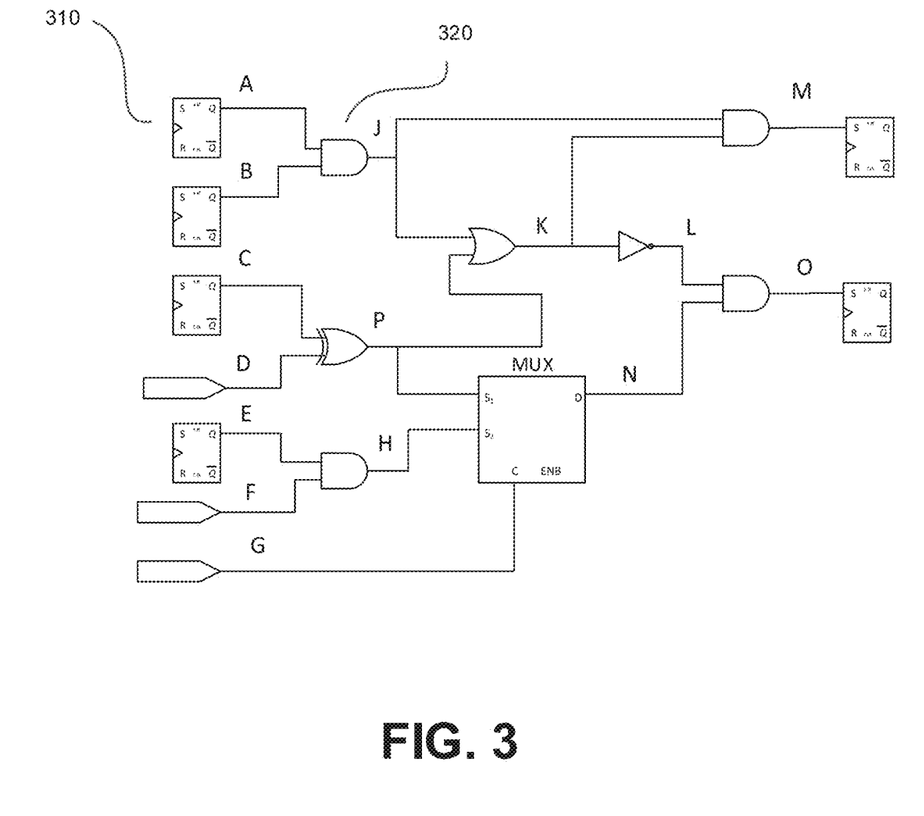
FIG. 3 shows an illustration of a circuit, in accordance with some exemplary embodiments of the subject matter.

To calculate the EPP of a specific gate, the EPP is calculated from the output node of the said gate to all other flop-inputs nodes in the gate's load (or the flops it is influencing), in the example of FIG. 3, to calculate the EPP of gate P, we first calculate po=EPP(P to O) and pm=EPP(P to M). Then the different resulting EPP's of this gate may be combined into one value using different methods: one can be taking the highest value amongst all EPPs of this gate (MAX[po, pm]), or probability union between them: (po+pm−po*pm) and any other method. In the example of FIG. 3, we may combine the two EPPs using MAX method; So, EPP(P)=MAX(po, pm).

In some exemplary embodiments, the disclosed subject matter may be used with respect to a portion of the circuit and not the entire circuit design. In some exemplary embodiments, the portion of the circuit may be a specific scope of the circuit.

In some exemplary embodiments, the disclosed subject matter may be used with respect to a portion of the circuit and not the entire circuit design. In some exemplary embodiments, the portion of the circuit may be the combo-logic-clouds that are the inputs certain set of flip-flops.

In some exemplary embodiments, if a flop is determined to be not critical (e.g., as described in U.S. Ser. No. 14/601,312 filed on Jan. 21, 2015), calculation of the EPP of its combo-gate may be avoided. In such a case the total run time may be reduced. In other words, a subset of the flops to be analyzed may be created based on the teachings of U.S. Ser. No. 14/601,312 filed on Jan. 21, 2015. The EPP may be calculated only with respect to the subset.

One technical effect of utilizing the disclosed subject matter is assisting the user to perform selective hardening. The user may knowingly select to invest in protecting some combo-gates in view of their susceptibility to inflict EPs.

Figure 1:
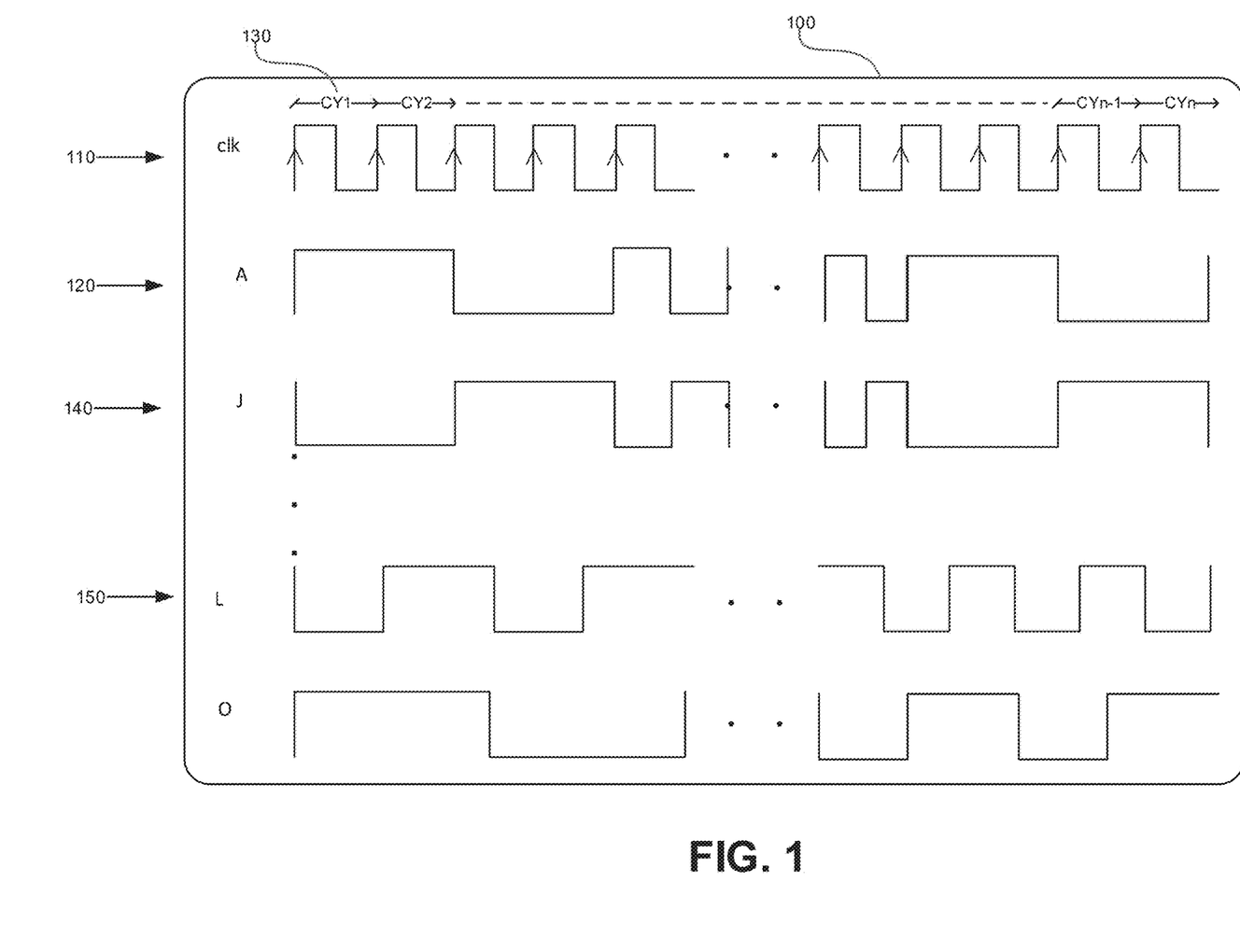
FIG. 1 shows an illustration of a trace, in accordance with some exemplary embodiments of the subject matter.

Referring now to FIG. 1 showing an illustration of a trace, in accordance with some exemplary embodiments of the subject matter;

A Trace 100 may be used to represent recorded values of signal in a circuit design, such as for example, a microprocessor, or the like. Trace 100 may be visualized as snapshot of a state machine that reveals the behavior of the nodes of the circuit at each given cycle of the trace. In some exemplary embodiments, Trace 100 may be a file comprising recorded binary values in an execution of the circuit, such as Circuit 200 of FIG. 2. In some exemplary embodiments, Trace 100 may be data-structure comprising recorded binary values in an execution of the circuit, such as Circuit 200 of FIG. 2. The values of the trace may be calculated throughout a software simulation process of the circuit. Additionally or alternatively, the trace may be captured by a logic analyzer from an actual execution of the circuit. The letters on the left side, like J in 140 and L in 150 are an identification of the signal whose values are displayed as a waveform on right.

In some exemplary embodiments, the EPP of a certain pair source-node and destination-node is calculated using formula-method (explained below) or calc-forward-method (also explained below). Both methods may examine all the relevant cycles in the trace files, for each such cycle, it is examined if an error injected on the source-node (value flip, or inversion of the trace value at the said cycle), will propagate to destination-node (EP) when the calculated value of destination-node is flipped (inverted from the trace value at the said cycle), or stay as it is original value in the trace, no EP. The number of occurrences of EPs is saved in the variable N, the number of cycles this calculation is examined is saved in M, then EPP may be calculated using: EPP=N/M. Any cycle that is not conclusive for any reason and we don't know if EP or not, does not increment neither M nor N.

Both the formula-method and the calc-forward-method, the logic-value at destination-node at the given cycle is calculated, when the value at source-node is inverted from its trace-value at that cycle and some of the other nodes keep their value as in the trace at that cycle. The calculated value of destination-node is compared to its trace value at that cycle to decide if EP or not.

In the formula-method, for a pair of nodes and a given cycle: LOI (Logic Of Influence) is calculated to include all the nodes that influence destination-node only through combinatorial logic. For the circuit in FIG. 3, LOI (destination-node=O)={O, L, K, J, A, B, P, C, D, N, H, E, F, G}

Then LLOI (Load Logic Of Influence) is calculated to include a sub-set of LOI where only nodes influenced by source-node are in this sub-set. For FIG. 3, LLOI (P→O) ={L, K, N}

In the formula method, using FIG. 3 as an example, where source-node=P and destination-node=O, the value of O may be calculated using: P inverted from the trace value, L, K, N may be calculated using their gate operation (for example, K will get the OR between J and P). All the other nodes, the trace value at that cycle may be used.

Figure 4:
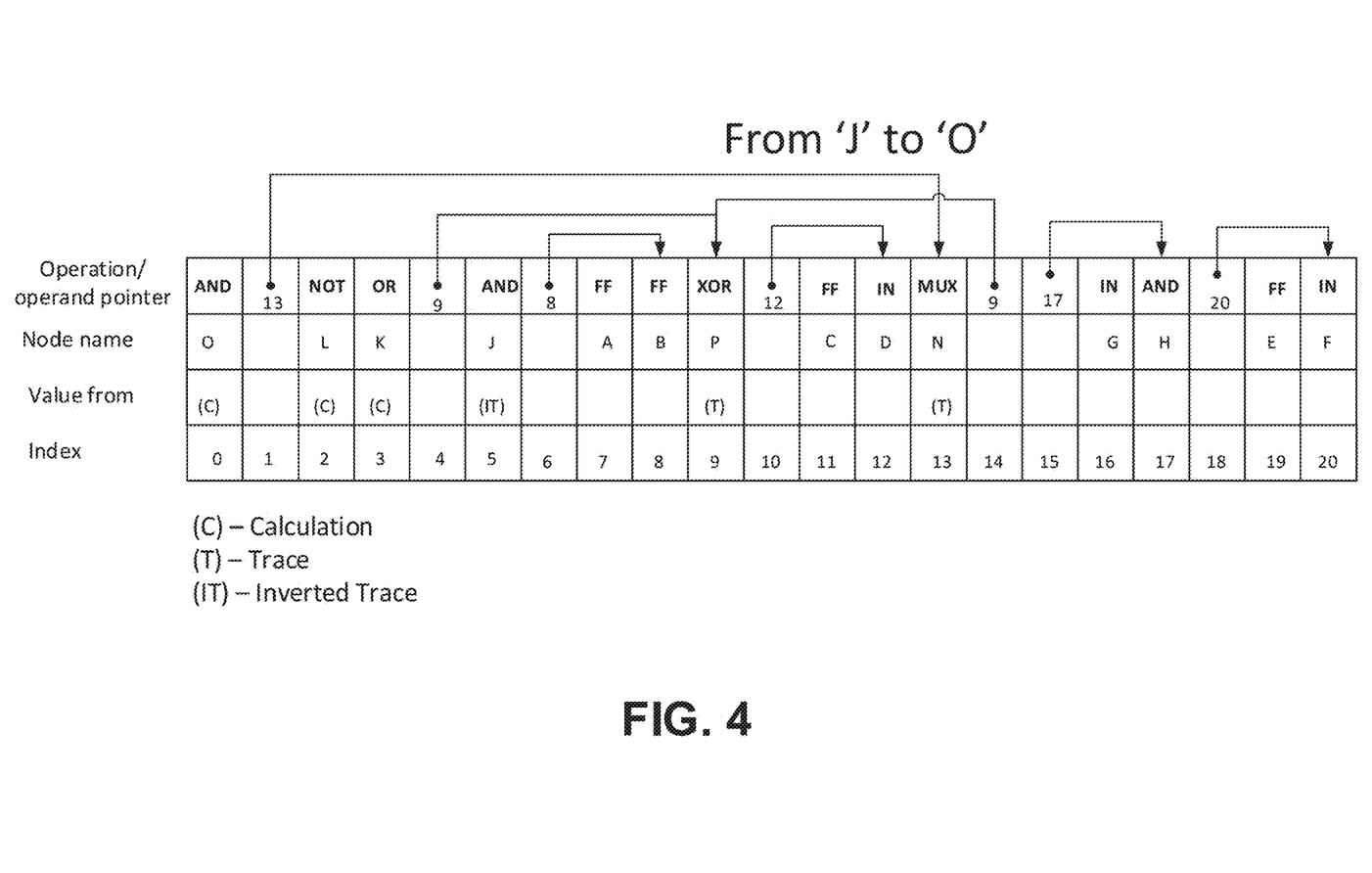
FIG. 4 shows an illustration of a data structure, in accordance with some exemplary embodiments of the subject matter.
Figure 5:
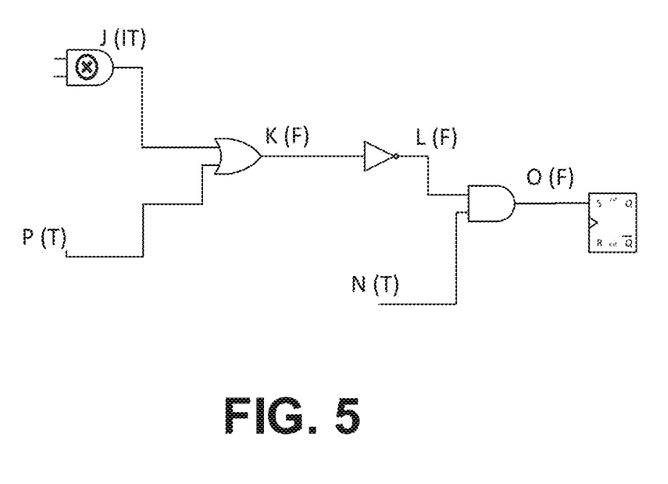
FIG. 5 shows an illustration of a circuit, in accordance with some exemplary embodiments of the subject matter.

When using the formula method, the combo-logic driving the destination is converted into a formula, using a data structure such as illustrated in FIG. 4. This structure may be an array, each array entry contains 3 elements: {Operation or Operand Pointer, Node Name, Value Source}. The first element is either an opcode representing the function of a combo-gate, such as AND, OR and the like, in some cases, it includes an index in the array, pointing to where a parameter of the opcode may exist. Node name element is a name of the node to which the cell refers. The third element—Value Source—is where to take the value of the said node from, it will be either: T—(Trace), take value from the trace file, IT (Inverted Trace), take the value from the trace-file and invert it, or C (Calculate), calculate recursively the value of this node, by using the OP and its operand(s). Each operation may be followed by number of parameters that match its operation according to a predetermined order, for example: NOT may have one parameter, AND may have 2 and the MUX may have 3 in some order, such as: in1, in2 and select. The last operand sits immediately at is location, while the first n−1 operands may have index pointers to a different location in the array. FIG. 4 is an illustration of how the circuit driving node O in FIG. 3 will show in this data-structure.

Each destination-node may have one formula data-structure (lines 401 and 402), but different Value source (Line 403) based on the source-node it is paired with.

Source node may influence the Value From filed of each node. The value IT may be assigned to the Value From of the source-node itself, to indicate the need to simulate the case this node has an invert value of the trace value (error injected), at the said cycle. Destination-Node and any node in LLOI, may have C (for Calculate) to indicate the need to calculate it, since it is influenced by source-node; all other nodes in the formula may have T to indicate the need to use the trace value. This may save calculation time and uses the trace as cache instead of calculating the values.

The actual calculation, when needed, may be done in a recursive manner, starting from destination-node, any node with T we take its trace value, any node with IT we take the inverted trace value, any node with C we calculate its value based on its operation and its parameters in a recursive manner.

The calc-forward-method, may be done as follows:
1—An array of binary values (array name: "values") that can be indexed by node is used to store the current value of each relevant node.
2—"values" is initialized so that each node will have its value as in the trace at the said cycle.
3—The value of source-node is inverted in "values".
4—A list of nodes to be re-calculated is maintained in a variable named: "events"
5—"events" is initialized to include one node: source-node
6—A loop is performed until events is empty, inside the loop:
   6.1 the first node (my_node) in events is removed
      6.2 the value of my_node is calculated based on the gate driving this node and the values of the input nodes to this gate from values
      6.3 If the new value of my_node is different than its value in "values"
         Then the new value is updated to "values"
            and all nodes influenced directly by my_node are added to events list
7—When the loop is done, the value of destination_node in values may be considered the calculated value, it may be compared to its trace value to determine if the error has propagated to destination-node or not In some exemplary embodiments, Trace 100 may be a typical trace. The typical trace may be representing a simulation of typical operation of the circuit. In this disclosed subject matter the term typical operation may be used to describe common operation, process that takes place most of the time, process the is performed in average over a predetermined percentage of the time, or the like. As an example, the circuit may be configured as Motion Control Unit (MCU) of a radar system. The MCU normally operates 95% of the time in scanning area of interest, while only 5% of its operation time may be used for initialization. Hence, the trace excluding the initializing time segment may be the typical trace. Additionally or alternatively, the typical trace may exclude initialization processes, handling of exceptions, shutdown operations, boot cycles, or the like.

In some exemplary embodiments, the typical trace may be used as a base line representing an expected operation of the design. While any trace whether typical or not can be used, typical trace may produce better results. In some exemplary embodiments, multiple traces can be used. For example, Worst case values may be used: the calculation of the EPP is performed on each combo-gate on each of traces, then the highest EPP between them is used for this combo-gate. As another example, the values may be combined: the sum of N and M from all traces are used in calculating EPP=N/M In some exemplary embodiments, Trace 100 may comprise a Clock Signal 110. Clock Signal 110 may be used as a synchronous clock used to define cycles of the circuit. In some exemplary embodiments, Trace 100 may comprise a finite number of cycles, where each one of them may be sequentially numbered. In some exemplary embodiments, the length of a trace may be determined by the number of cycles. Additionally or alternatively, only a portion of Trace 100 may be of interest, such as one or more portions thereof that represent cycles of the typical trace. In some exemplary embodiments, predetermined marking cycles may be set to indicate boundaries of a Region of Interest (ROI) within the trace, thereby used to indicate a portion of the trace which is considered to be the typical trace.

In some exemplary embodiments, Trace 100 may comprise signals for elements of the circuit, such as Signal 120. In some exemplary embodiments, Signal 120 may be a signal indicating the state of an element of the circuit that is referred to as a node. The node may be the output of a combo-gate, the input to a combo-gate, the output of a memory element (flip-flop, latch, register or the like), the input to a flip-flop, an output of the circuit or a portion thereof, an input to the circuit or a portion thereof, or the like. Signal 120 may indicate a value for each cycle, such as for example the value at $CY_1$ 130.

It should be noted that the term combo-gate covers any basic building block using which the chip is built, like: AND-gate, Or-Gate, XOR-Gate, NAND-Gate, NOR-Gate, XNOR-Gate, MUX-Gate, and the like.

It should be noted that in the present disclosure the term "flop" may refer to a memory element, such as for example, a flip-flop, a register, a latch, a counter, a digital element having the capability to retain its value, or the like.

It should be noted that in the present disclosure the term gate include all comb-gates in addition all memory elements. Accordingly, the term node may be synonymous to the term gate.

Additionally or alternatively, Signal 120 may be associated to an output of a gate, such as, Flop 301 of FIG. 3, and retain the same value as the flop's output. In some exemplary embodiments, the value of the Signal 120 may be cycle dependent and may change from cycle to cycle. As an example the value of Signal 120 may be "1" in cycles $CY_1$ 130 and in $CY_2$, while in $CY_{n-1}$ and $CY_n$, the value of Signal 120 is "0".

Additionally or alternatively, Signal 140 may be associated to an output of a combo-gate, such as, AND-gate J or 320 of FIG. 3, and retain the same value as the output of this combo-gate. In some exemplary embodiments, the value of the Signal 140 may be cycle dependent and may change from cycle to cycle. As an example the value of Signal 140 may be "0" in cycles $CY_1$ 130 and in $CY_2$, while in $CY_{n-1}$ and $CY_n$, the value of Signal 120 is "1".

Figure 2:
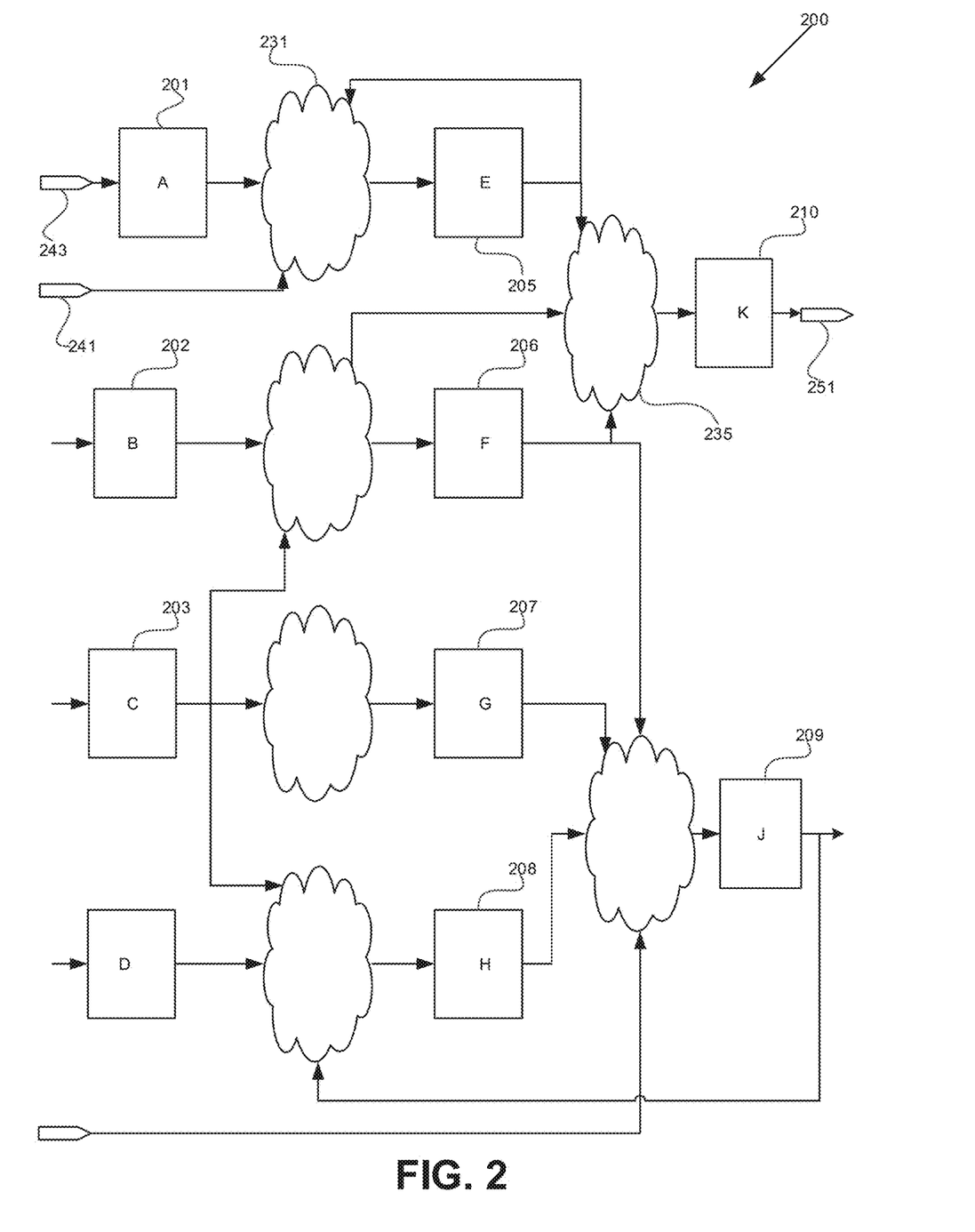
FIG. 2 shows an illustration of a circuit, in accordance with some exemplary embodiments of the subject matter.

Referring now to FIG. 2 showing an illustration of a circuit, in accordance with some exemplary embodiments of the subject matter.

A Circuit 200 may be a design representation of a circuit. The design depicted in Circuit 200 may comprise hardware elements and conductors linking them to one another. In some exemplary embodiments, Circuit 200 may be obtained in the form of one or more electronic design files, for example, a Netlist file, Register Transfer Level (RTL), Hardware Description Language (HDL) like Verilog or VHDL, a combination thereof, or the like.

In some exemplary embodiments, Circuit 200 may comprise flops, such as Flop 201. Flop 201 may be a memory element, such as for example, a flip-flop, a register, a latch, a counter, a digital element having the capability to retain its value or the like. Flop 201 may have an input, an output and a clock input (not shown). The output of the flop, also referred to as a state of the flop, may sample the value of its input on each cycle (e.g. clock tick). As a result, the flop retains its value until a next cycle.

In some exemplary embodiments, the input of the flop may be connected to an output of a different flop (not shown). Additionally or alternatively, the input of the flop may be connected to an input-port of the circuit, for example, Input-Port 243 is connected to the input of Flop 201. Additionally or alternatively, the input of the flop may be connected to a combinatorial-logic (combo-logic), for example, Combo-Logic 231 may be connected to the input of Flop 205. It will be noted that other wires may be connected to the input of the Flop. In some exemplary embodiments, the output of the flop may be connected to the input of a different flop (not shown). Additionally or alternatively, the output of the flop may be connected to an output-port of the circuit. As an example, output of Flop 210 is connected to Output-Port 251. Additionally or alternatively, the output of the flop may be connected to a combo-logic. For example, output of Flop 201 is connected to Combo-Logic 231. It will be noted that other wires may be connected to the output of the Flop. A combo-logic cloud, may have a single outputs or multiple output, each output represent a logical formula of the inputs to the Combo-Logic cloud.

In some exemplary embodiments, Circuit 200 may comprise a combo-logic, such as Combo-Logic 231. Combo-Logic 231 may comprise, non memory elements; logic gates, such as for example, AND gate, OR gate, NOT gate, NAND gate, NOR gate, XOR gate; a combination thereof, or the like. The combo-logic may be connected to any input or output of any element of the circuit. In some exemplary embodiments, the combo-logic may not have the capability to retain the value of its elements in a consecutive cycle.

In some exemplary embodiments, Circuit 200 may comprise input-ports such as Input-Port 241. In some exemplary embodiments, input-ports may be used to receive signals from a different circuit, a different portion of the same circuit, an external device, or the like.

In some exemplary embodiments, Circuit 200 may comprise output-ports such as Output-Port 251. In some exemplary embodiments, output-ports may be used to transmit signals to a different circuit, a different portion of the same circuit, an external device, or the like.

In some exemplary embodiments, Flops 201, 202, 203, 205 and 206 and Input-Ports 243 and 241 may be in the Logic Of Influence (LOI) of Flop 210. Put differently, the LOI of Flop 210 may comprise all the nodes having direct or indirect path to the input of Flop 210 and, therefore, may influence Flop 210.

In some exemplary embodiments, Flop 201, Flop 205, and Input-Port 241 may be in an immediate LOI of Flop 205. Put differently, the immediate LOI of Flop 205 may comprise all the nodes having direct path, including through combo logic, to the input of Flop 205 and, therefore, may influence Flop 205 in the following cycle.

In some exemplary embodiments, Output-Port 251 and Flops 206, 207, 208, 209 and 210 may be in the load of Flop 203. Put differently, the load of Flop 3 may comprise all the nodes having direct or indirect path from the output of Flop 210 and, therefore, may be influenced by Flop 210.

In some exemplary embodiments, Flop 206, 207, 208 and 210 may be in an immediate load of Flop 203. Put differently, the immediate load of Flop 203 may comprise all the nodes having direct path, including through combo logic, from the output of Flop 203 and, therefore, may be influenced by Flop 203 in the following cycle.

In some exemplary embodiments, hardening of the combo-gates may be performed based on the EPP of the node. There may be multiple techniques to harden a node, where each technique may present a different tradeoff between circuit real-estate, power consumption, cost and resilience to TEs. In some exemplary embodiments, different hardening techniques may be recommended. In some exemplary embodiments, the hardening recommendation may indicate which hardening technique to utilize for each node. As an example, a first technique may reduce the probability that an TE will occur in the node to 0% and increase the real-estate of the node by 200%; a second technique may reduce the probability that a TE will occur to 5% and may increase the real-estate of the node by 130%; a third technique may reduces the probability that an TE will occur to 10% and may increase the real-estate of the node by 80%. In one embodiment, for a node having EPP lower than 1%, the disclosed subject matter may recommend not to perform any hardening; for a node having EPP greater than 1%, and smaller than 2%, the recommendation may be to perform the third technique; for a node having EPP greater than 2%, and smaller than 5%, the recommendation may be to perform the second technique; and for a node having EPP greater than 5%, the recommendation may be to use the first technique.

In some embodiments, the disclosed subject matter may automatically select the hardening method based on EPP regardless of how the EPP was calculated.

In some exemplary embodiments, the method according to the disclosed subject matter may be performed with respect to multiple number of traces. The EPP may be calculated based on aggregated values (e.g., aggregated N and M values). Additionally or alternatively, the EPP may be calculated separately for each trace and the final EPP may be determined based on the trace-specific EPPs, such as by selecting the maximal trace-specific EPP, by computing an average thereof, or the like.

Figure 6:
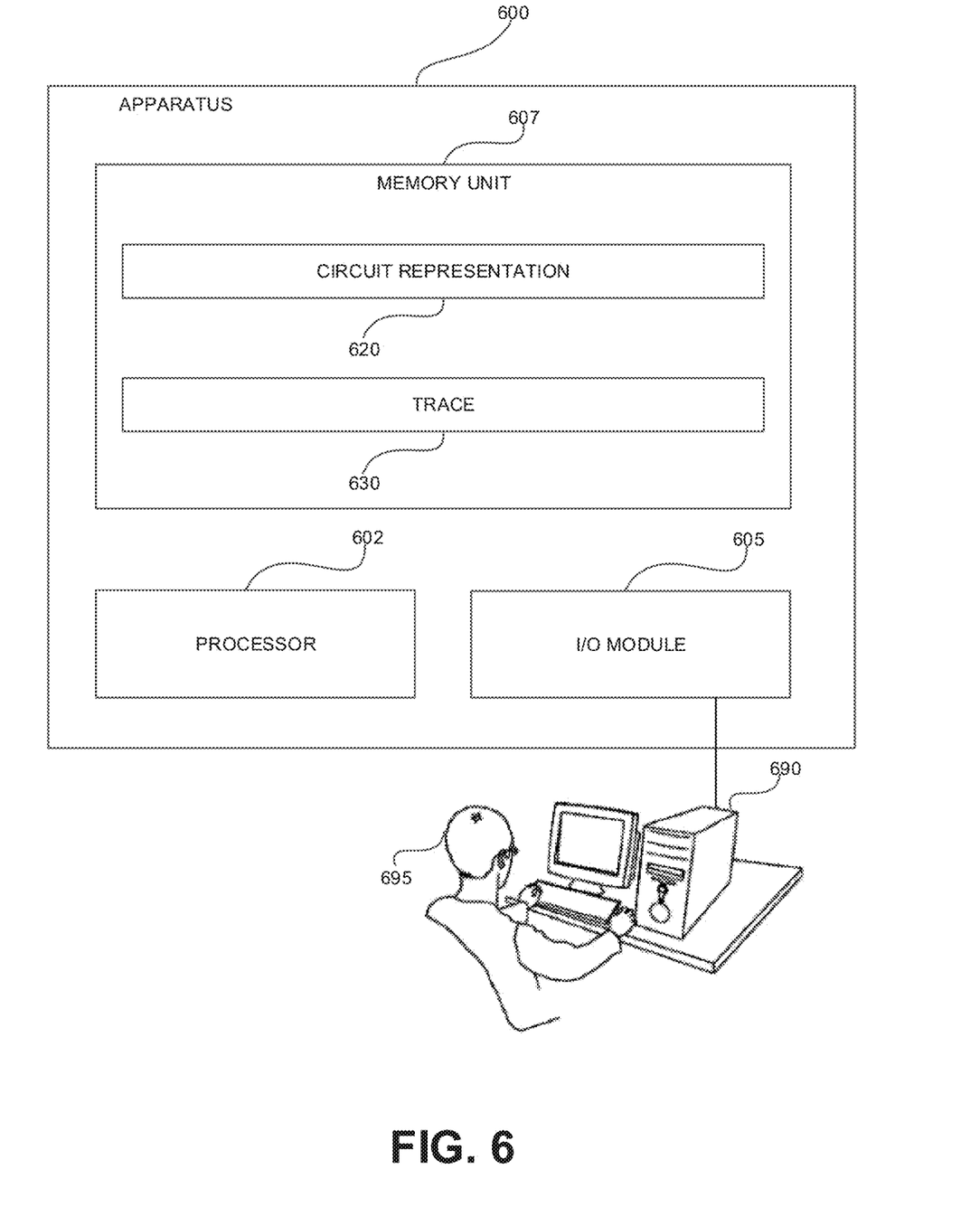
FIG. 6 shows an apparatus in accordance with some exemplary embodiments of the disclosed subject matter.

Referring now to FIG. 6 showing an apparatus in accordance with some exemplary embodiments of the disclosed subject matter. An Apparatus 600 may be a computerized apparatus adapted to perform methods in accordance with the disclosed subject matter.

In some exemplary embodiments, Apparatus 600 may comprise a Processor 602. Processor 602 may be a Central Processing Unit (CPU), a microprocessor, an electronic circuit, an Integrated Circuit (IC) or the like. Processor 602 may be utilized to perform computations required by Apparatus 600 or any of it subcomponents.

In some exemplary embodiments of the disclosed subject matter, Apparatus 600 may comprise an Input/Output (I/O) Module 605. I/O Module 605 may be utilized as an interface to transmit and/or receive information and instructions between Apparatus 600 and external I/O devices, such as a Workstation 690, or the like.

In some exemplary embodiments, I/O Module 605 and Workstation 690 may be used to provide an interface to a User 695 of the system, such as by providing output, visualized results, reports, or the like. In some exemplary embodiments, the output provided to User 695 may comprise EPP values of the nodes, hardening recommendation the nodes, a combination thereof, of the like. In some exemplary embodiments, Workstation 690 may be used to obtain from User 695 parameters, such as, a typical trace, a circuit, a list of critical nodes, conditions of conditional critical nodes, simulation thresholds, cycle markers, a combination thereof, of the like.

In some exemplary embodiments, Apparatus 600 may comprise a Memory Unit 607. Memory Unit 607 may be a hard disk drive, a Flash disk, a Random Access Memory (RAM), a memory chip, or the like. In some exemplary embodiments, Memory Unit 607 may retain program code operative to cause Processor 602 to perform acts associated with any of the subcomponents of Apparatus 600.

In some exemplary embodiments, Memory Unit 605 may be used to retain components, such as, a Circuit Presentation 620, a Trace 630, or the like. In some exemplary embodiments, Circuit Presentation 520 may be, for example, a Netlist file describing a digital circuit design, such as depicted in FIG. 2. Circuit Presentation 620 may comprise nodes. In some exemplary embodiments, Trace 630 may comprise one or more trace files representing a simulation of a typical operation of the circuit design. Trace 630, such as, Trace 100 of FIG. 1, may be visualized as snapshot of a state machine that reveals the values of relevant nodes at each given cycle of the trace. In some exemplary embodiments, Trace 630 may be a product of the simulation, which may be performed by HDL software simulator, an emulator and a hardware accelerator, or the like. Additionally or alternatively, Trace 630 may include values of signals that are not nodes. Values of the signals that are not nodes may or may not be omitted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
obtaining a representation of a circuit, wherein the circuit comprises nodes, wherein the nodes comprise at least one source-node and one destination-node;
obtaining a trace of a reference execution, wherein the trace comprises recorded values of the nodes in a plurality of cycles that were computed during the reference execution;
determining, by a processor, an Error Infliction Probability (EPP) of a pair of nodes, the pair comprising a source-node and a destination-node, wherein the EPP is a value representing a probability that a Transient Error (TE) happening on the source-node propagating to the destination-node in the same clock cycle it happened, wherein said determining comprises simulating a propagation of the TE from the source-node to the destination-node for plurality of cycles in the trace, wherein said simulating, in each cycle, utilizes values from the trace for nodes that are not influenced by the TE and that are in the Logic of Influence (LOI) of the destination-node, wherein the EPP is calculated as N/M, where N is the number of times the error propagated to destination-node, and M is the number of cycles examined; and outputting the EPP of the node.

2. The computer-implemented method of claim 1, wherein said simulating the propagation of the TE for a given pair of destination-node and source-node and a given cycle is preformed by inverting the value of the source-node from the trace for the said cycle, calculating the new value of destination-node, using trace values of the same cycle for all other nodes not influenced by source-node, then comparing the calculated value of destination-node to its value in the trace at the same cycle to determine if the error has propagated.

3. The computer-implemented method of claim 2, wherein calculating the new value of destination-node is performed by applying a formula-method or a calc-forward-method.

4. A computerized apparatus comprising a processor configured to perform obtaining a representation of a circuit, wherein the circuit comprises nodes, wherein the nodes comprise at least one source-node and one destination-node;

obtaining a trace of a reference execution, wherein the trace comprises recorded values of the nodes in a plurality of cycles that were computed during the reference execution;

determining, by a processor, an Error Infliction Probability (EPP) of a pair of nodes, the pair comprising a source-node and a destination-node, wherein the EPP is a value representing a probability that a Transient Error (TE) happening on the source-node propagating to the destination-node in the same clock cycle it happened, wherein said determining comprises simulating a propagation of the TE from the source-node to the destination-node for plurality of cycles in the trace, wherein said simulating, in each cycle, utilizes values from the trace for nodes that are not influenced by the TE and that are in the Logic of Influence (LOI) of the destination-node, wherein the EPP is calculated as N/M, where N is the number of times the error propagated to destination-node, and M is the number of cycles examined; and outputting the EPP of the node.

5. A computer program product comprising a non-transitory computer readable storage medium retaining program instructions, which program instructions when read by a processor, cause the processor to perform:

obtaining a representation of a circuit, wherein the circuit comprises nodes, wherein the nodes comprise at least one source-node and one destination-node;

obtaining a trace of a reference execution, wherein the trace comprises recorded values of the nodes in a plurality of cycles that were computed during the reference execution;

determining, by a processor, an Error Infliction Probability (EPP) of a pair of nodes, the pair comprising a source-node and a destination-node, wherein the EPP is a value representing a probability that a Transient Error (TE) happening on the source-node propagating to the destination-node in the same clock cycle it happened, wherein said determining comprises simulating a propagation of the TE from the source-node to the destination-node for plurality of cycles in the trace, wherein said simulating, in each cycle, utilizes values from the trace for nodes that are not influenced by the TE and that are in the Logic of Influence (LOI) of the destination-node, wherein the EPP is calculated as N/M, where N is the number of times the error propagated to destination-node, and M is the number of cycles examined; and outputting the EPP of the node.

* * * * *